(No Model.)

J. D. GRISWOLD.
SUSPENSION DEVICE FOR LAMPS.

No. 346,098. Patented July 27, 1886.

Witnesses
James D. Griswold
J R Bowen

Inventor
Jas. D. Griswold
by his attorneys,
Gifford & Brown

UNITED STATES PATENT OFFICE.

JAMES D. GRISWOLD, OF BROOKLYN, NEW YORK.

SUSPENSION DEVICE FOR LAMPS.

SPECIFICATION forming part of Letters Patent No. 346,098, dated July 27, 1886.

Application filed October 19, 1885. Serial No. 180,228. (No model.)

*To all whom it may concern:*

Be it known that I, JAMES D. GRISWOLD, of Brooklyn, in the county of Kings and State of New York, have invented a certain new and useful Improvement in Suspension Devices for Lamps and other Articles, of which the following is a specification.

I will describe in detail a suspension device embodying my improvement, and then point out the novel features in claims.

Figure 1:
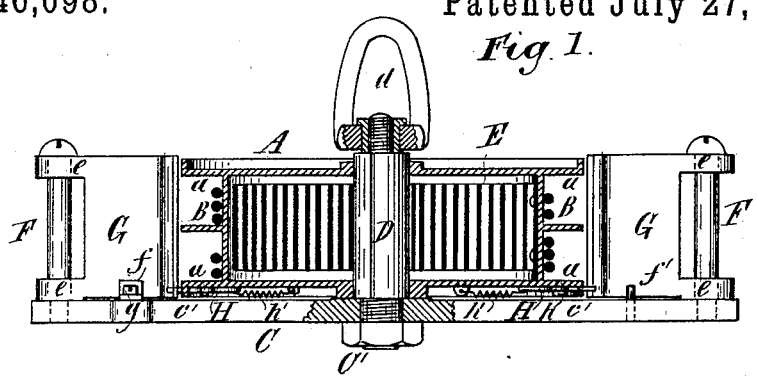
Figure 2:
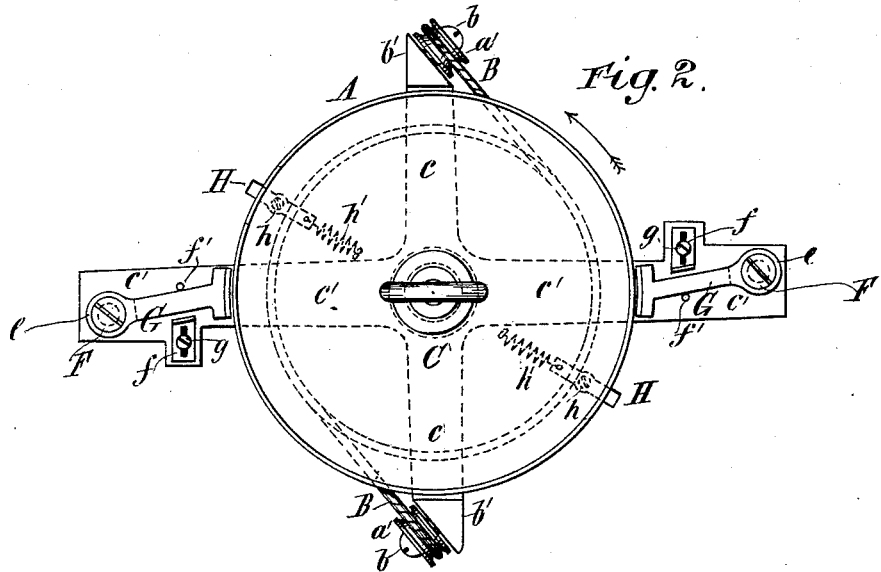

In the accompanying drawings, Figure 1 is a side elevation, partly in section, of a suspension device embodying my improvement, and Fig. 2 is a plan or top view of the same.

Similar letters of reference designate corresponding parts in both figures.

A designates a hollow cylindrical drum of any desired metal. It is provided with circumferential flanges $a$. As shown, the upper and lower of said flanges are bent circumferentially upon their peripheries in such manner as to form broad surfaces extending at approximate right angles to the main portions of the flanges. Instead of bending the metal composing the flanges to form these broad surfaces, separate pieces of metal may be secured to the peripheries of the flanges, if desirable.

Between the flanges cords or chains B are wound upon the drum. After leaving the drum said cords or chains pass over guides $a'$, here shown as pulleys mounted upon pins or studs $b$ upon upwardly-extending portions $b'$ of a frame, C. The frame C is shown as of spider-like construction having four arms, $c\ c'$, extending from a central portion, provided with an aperture, through which extends an arbor, D. The arms $c$ have upon them the upwardly-extending portions $b'$. The arbor D extends loosely through a central aperture in the drum A, and the drum may turn freely about the same. Its upper end is provided with a screw-cap, to which is connected by a swiveling connection a loop, $d$, by which the device may be suspended. The arbor is prevented from rotation by means of a feather or spline between it and the frame C. A nut, C', below the frame prevents the latter and the drum from moving off from the arbor.

Within the drum is a counter-balance consisting of a convolute spring, E. One end of the spring is secured to the arbor D and the other to the drum near the periphery thereof. The object of this spring is to counterbalance the weight of a lamp or other article suspended from the cords or chains B.

Mounted upon the arms $c'$ of the frame near one of the ends thereof, and beyond the circumference or periphery of the drum, are posts F, shown as screw-threaded near one of their ends, to fit in tapped holes in said arms $c'$, and provided with nuts below the said arms. These posts are preferably rigid; but they need not necessarily be so. They extend at approximate right angles to the top and bottom of the drum, and are approximately parallel with the periphery thereof.

Swinging brakes G are mounted on the posts F. In this example of my improvement the brakes are solid, and may be cast; but they may be otherwise constructed, if desirable. The posts F extend loosely through suitable apertures in lips or lugs $e$ on the brakes G. The portions of the brakes G which are nearer the periphery of the drum constitute brake-shoes, having their faces or surfaces nearer the drum curved or struck approximately in the arc of a circle corresponding to that of the drum. Preferably these surfaces will be covered with leather, india-rubber, or other suitable material of considerable frictional resistance. The brakes are intended to always occupy a position at a slight angle to radii of the drum during their movements. Stops $f\ f'$ upon the arms $c'$ prevent the swinging of the brakes too far in either direction. The stops $f$ are adjustable toward and from the brakes. This adjustment is secured by means of set-screws $g$, passing through slots in said stops in a well-known manner.

H designates tappets. These tappets are, as shown, arranged upon the bottom of the drum. They may turn loosely about pivots $h$, extending through the lower of the flanges $a$. Their outer ends project for a distance beyond the periphery of said flange. Coil-springs $h'$, secured at one of their ends to the inner ends of the tappets and at their other ends to the drum, tend to maintain the tappets in lines radial to the drum.

When the drum rotates in a direction indicated by the arrow in Fig. 2, or, in other words, in a direction to unwind the cords or chains, the outer ends of the tappets come in contact with the brakes and move them into intimate contact with the drum. The brakes are then moved by the drum until stopped by the stops $f$, and continue to exert their influence on the drum so long as the drum rotates in said direction. When the brakes are stopped, the rotation of the drum carries the tappets past the brakes. By adjusting the stops $f$ the pressure with which the brakes shall bear against the drum may be varied. When the drum rotates in a direction to rewind the cords or chains, or in a direction opposite to that indicated by the arrow, it moves the brakes out of intimate contact with it, and the drum may then rotate freely. The movement of the brakes out of intimate contact with the drum will also be assisted by the tappets, as may be seen.

Of course but one brake need be used, if desirable.

What I claim as my invention, and desire to secure by Letters Patent, is—

1. In a suspension device, the combination of a spring-drum, an arbor upon which said drum is mounted and about which it may rotate, a counterbalance-spring acting in conjunction with the drum, cords or chains wound upon the drum and passing over guides to the lamp or other article to be suspended, a brake pivotally connected to a portion of said frame or an appurtenance of the frame located beyond the periphery of the drum, said brake extending toward the drum at a slight angle to a radius thereof, frictional contact between the brake and the drum operating to swing the brake in the direction of the drum, and a stop or stops for limiting the movement of the brake, substantially as specified.

2. In a suspension device, the combination of a spring-drum, an arbor upon which said spring-drum is mounted and about which it may rotate, a counterbalance-spring acting in conjunction with the drum, cords or chains wound upon the drum and passing over guides to the lamp or other article to be suspended, a brake pivotally connected to a portion of said frame or an appurtenance of the frame located beyond the periphery of the drum, said brake extending toward the drum at a slight angle to the radius thereof, a tappet for forcing the brake into and out of intimate contact with the drum, and a stop or stops for limiting the movement of the brake, substantially as specified.

3. The combination of the spring-drum A, the frame C, a post, F, a brake, G, mounted upon the post F, and the adjustable stop $f$, substantially as specified.

4. The combination of the spring-drum A, the frame C, the posts F, the brakes G, mounted upon the posts F, and the stops $f f'$, substantially as specified.

5. The combination of the spring-drum A, the frame C, the posts F, the brakes G, mounted upon the posts F, the stops $f f'$, and the tappets H, substantially as specified.

JAMES D. GRISWOLD.

Witnesses:
JAS. R. BOWEN,
M. FOWLER.